C. RICHEL.

Garden Line.

No. 70,022.

Patented Oct. 22, 1867.

Witnesses:
E. E. Waite
Frank S. Alden

Inventor.
C. Richel

United States Patent Office.

C. RICHEL, OF CLEVELAND, OHIO.

Letters Patent No. 70,022, dated October 22, 1867.

IMPROVEMENT IN GARDEN-LINE, &c.

The Schedule referred to in these Letters Patent and making part of the same.

TO ALL WHOM IT MAY CONCERN:

Be it known that I, C. RICHEL, of Cleveland, in the county of Cuyahoga, and State of Ohio, have invented certain new and useful improvements in Garden-Lines, &c.; and I do hereby declare that the following is a full and complete description of the same, reference being had to the accompanying drawings, making a part of this specification, in which—

Figure 1:
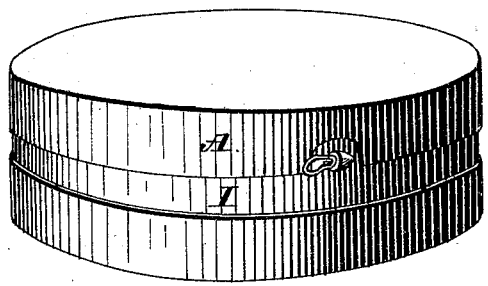
Figure 2:
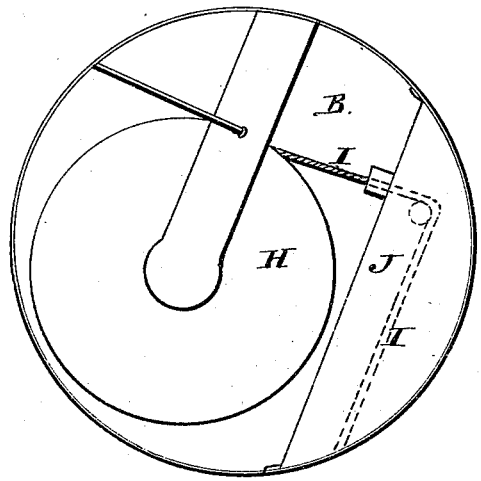
Figure 3:
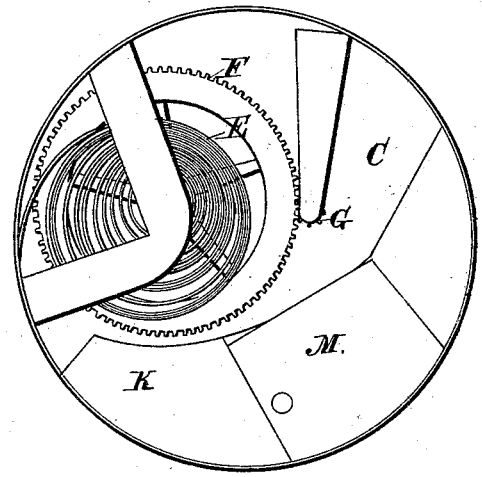
Figure 4:
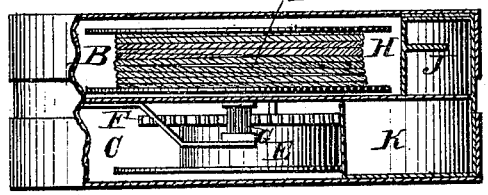

Figure 1 is a perspective view of the implement.
Figure 2 is a view of the inside from the top.
Figure 3 is a view of the inside from the bottom.
Figure 4 is a side view of the inside.
Like letters of reference refer to like parts in the views.

In fig. 1, A represents a metallic case or box, the size of which being according to the length of the line wound up within the same. This box is divided into two sections, B and C, fig. 4, by a diaphragm, D. In section C is arranged a coiled spring, E, fig. 3. On the spindle to which the spring is attached is keyed a cog-wheel, F, which is made to engage in a pinion, G. The shaft of this pinion is projected through the diaphragm into section B, and upon which is keyed a spool, H, on which spool is wound the cord or line I. The free end of this line is led from the spool through the chamber J to the outside of the case, where it terminates in a ring or knob, as shown in fig. 1. The lower section of the case is also provided with a chamber, K, figs. 3 and 4, the opening to which is closed by a sliding cover, M. Access is had to the upper chamber J by drawing out the inner side of the same, which side is attached to a supplementary top or cover for the convenience of removing the side, and also for the greater security of the chamber.

The practical operation of this apparatus is as follows, viz: The box is held in the left hand, then with the right the line is drawn out to any desired length. By the act of drawing out the line the coiled spring are tensioned up more or less, according to the length of the cord drawn out, but which, on liberating the line, will immediately recoil and wind it up again on the spool, and thus preserve it from becoming tangled, thrown about, lost, or injured.

This apparatus is very convenient for all purposes requiring the use of a line, as laying out gardens, walls, beds, rows, &c. It can also be used by builders as a guide-line or chalk-line, and for which either purpose it may be self-chalking, if so desired, by filling the chamber K with chalk dust. This chamber communicates with the chamber J by means of a hole, through which the chalk dust finds its way to the line, and chalks it as it runs through the chamber on being drawn out. This apparatus being self-winding much time and labor are saved in winding up the line after being used, and, as before said, saved from becoming tangled and lost, and when used as a chalk-line, by its being self-chalking, it is a most convenient time-saving and labor-saving apparatus, and requiring much less chalk to cover the line than if done in the ordinary way.

What I claim as my improvement, and desire to secure by Letters Patent, is—

The mechanical movements with a spring, in combination with the chalk-box and line, substantially as and for the purpose set forth.

C. RICHEL.

Witnesses:
 FRANK S. ALDEN,
 J. HOLMES.